United States Patent

[11] 3,632,915

| [72] | Inventor | Wilhelm Kramer<br>Sandhausen, Germany |
|---|---|---|
| [21] | Appl. No. | 15,784 |
| [22] | Filed | Mar. 2, 1970 |
| [45] | Patented | Jan. 4, 1972 |
| [73] | Assignee | Aktiengesellshaft Brown, Boveri & Cie<br>Baden, Switzerland |
| [32] | Priority | Mar. 4, 1969 |
| [33] | | Germany |
| [31] | | P 19 10 871.5 |

[54] HIGH-CURRENT ELECTRICAL SWITCHING UNIT ENCLOSED BY A HOUSING OF SPACED CONDUCTIVE BARS AND REMOVABLE INSULATING PLATES
5 Claims, 4 Drawing Figs.

[52] U.S. Cl. ............................................. 200/48 R,
174/52, 174/99 R, 200/163, 317/120
[51] Int. Cl. ....................................................... H02b 1/10
[50] Field of Search ............................................ 200/163,
148 B, 148, 48, 168; 317/103, 120; 174/52, 50, 54,
99 R

[56] References Cited
UNITED STATES PATENTS

| 2,813,178 | 11/1957 | Pierson et al. ................ | 200/163 |
|---|---|---|---|
| 2,959,657 | 11/1960 | Albright ........................ | 200/163 |
| 3,020,329 | 2/1962 | Deans............................ | 174/99 B |

FOREIGN PATENTS

| 361,319 | 5/1962 | Switzerland .................. | 200/148 B |

*Primary Examiner*—Robert K. Schaefer
*Assistant Examiner*—Robert A. Vanderhye
*Attorney*—Pierce, Scheffler & Parker

ABSTRACT: A high-current switch structure includes a plurality of switching units connected electrically in series and arranged along a common axis between two end connection terminals. The switching units are enclosed within a housing which includes an electrically conductive ring secured to each end terminal, circumferentially spaced electrically conductive bars extending between the end rings and insulator plates which extend between and are removably supported by the conductive bars that complete the housing structure. Sufficient spacing is provided between adjacent conductive bars to permit access to the switching units for servicing.

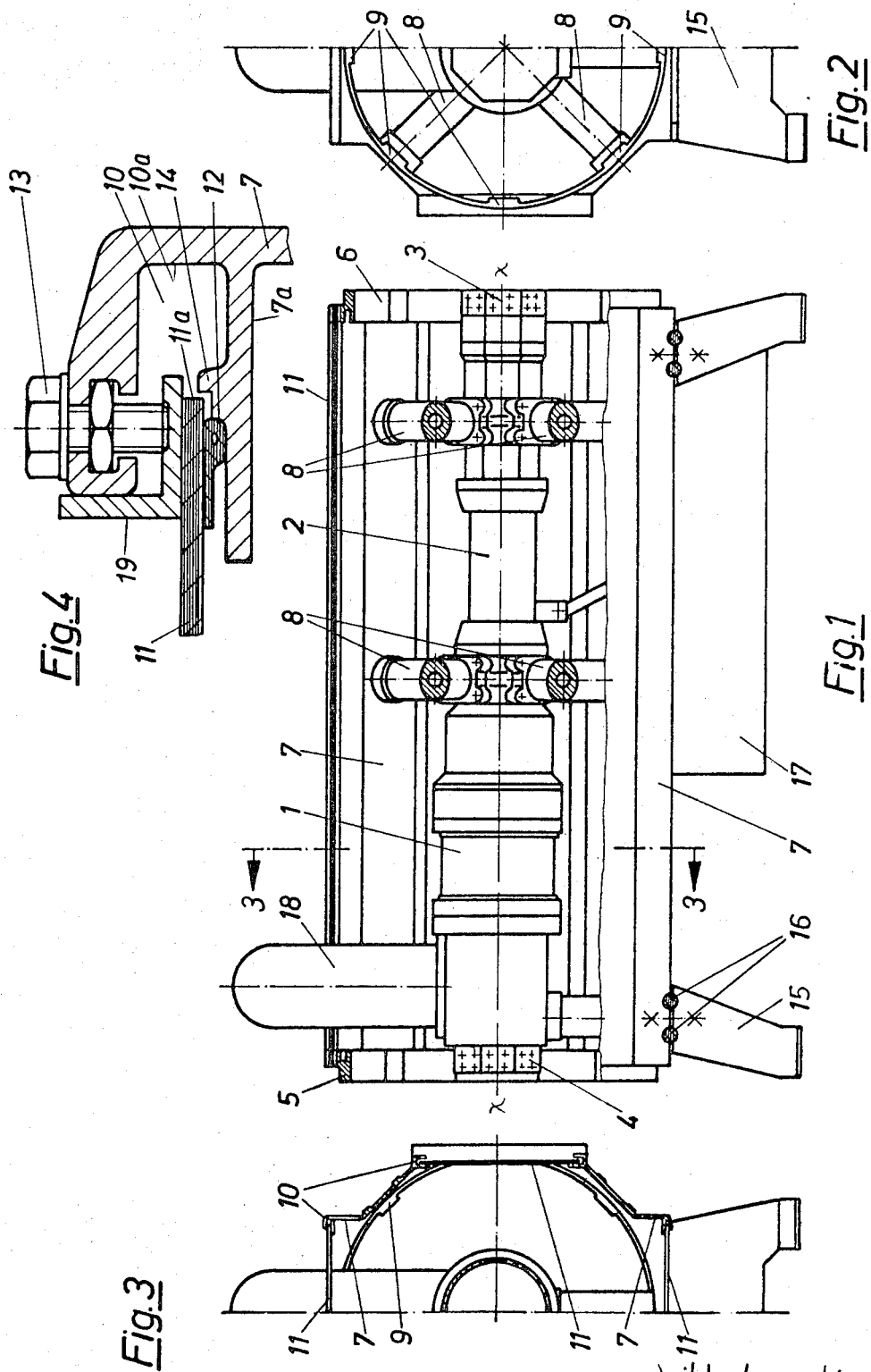

HIGH-CURRENT ELECTRICAL SWITCHING UNIT ENCLOSED BY A HOUSING OF SPACED CONDUCTIVE BARS AND REMOVABLE INSULATING PLATES

The present invention relates to electrical switches and more particularly to a high-current switch structure utilized as a generator switch installed in the line of a metal enclosed generator bus bar.

Switches of the foregoing type are most complicated because of the high-current intensities which have to be handled and they are arranged within specially designed switch panels into which the mostly metal-enclosed generator bus bar is introduced. Such an arrangement is more particularly described in Brown Boveri Mitteilungen, Volume 54, pages 762–768. The bulky construction of the switches, they are built mostly on an assembly line principle from different parallel connected elements of smaller switches, results in a considerable expenditure, not only for the switch itself but also for the panel components which have to be provided.

Considerable difficulties are encountered due to inductive and ohmic losses in the conductors, apparatus and panel parts as a result of the high-order currents which are continuous. The self-consistent magnetic fields of the current paths also induce appreciable eddy currents in the large-surfaced parts of the panel board enclosure, as well as in the metal frames and driving mechanism for the switch contacts. Moreover, due to the extremely high-current intensities involved, large electrodynamically created forces act on the switch which therefore necessitates the use of specially designed mechanical supporting structure for all current-carrying parts.

The principal object of the present invention is to limit the magnetic fields in these switches and switch panels to strictly outlined parts, particularly to the current path proper, and to eliminate as far as possible the adverse effect of electrodynamic current forces, and with the further objective of providing a more compact switch construction which permits a great degree of freedom as regards direct installation of the switch in an enclosed generator bus bar.

In accordance with the invention, the previously mentioned problems are obviated by an improved switch structure wherein the active parts of the switch such as the terminals, current-carrying parts and switching points with their drives are arranged along an axis, a pair of electrically conductive housing rings provided with current connection surfaces are located at opposite ends of the switch, and the two housing rings are electrically and mechanically connected with each other by means of electrically conductive longitudinally extending housing current bars arranged in a circumferentially spaced array around the switch parts proper and welded to the rings. Plates of insulating material fill in the spaces between adjacent housing current bars, and the assembly of bars and insulating plates thus establishes an enclosure for the above-mentioned active parts of the switch.

In a further development of the improved switch structure, in order to achieve a positive fastening of all the switch current-carrying parts within the framelike array of housing current bars, the former are carried by the latter by means of axially spaced spokelike radial arrays of supporting members which extend between the switch current-carrying parts and the housing current bars.

The two housing rings located at opposite ends of the switch and the housing current bars extending between them thus constitute a construction frame offering relatively easy access to the switch for servicing and repairs since the insulator plates forming major portions of the housing wall area covering the active parts of the switch are secured to the housing current bars in such manner as to permit easy removal, and the space between adjacent housing current bars is selected sufficiently large to permit removal and replacement of the switch parts through the gap between the bars.

In a preferred embodiment, a symmetrical arrangement of housing current bars and insulator plates is utilized, there being four identical profiled bars and four identical insulator plates, and the opposite edges of the bars being provided with longitudinally extending recesses for receiving and securing the opposite edge portions of the insulator plates located respectively between adjacent bars.

In order to permit direct assembly of the switch in an enclosed generator bus bar, and in order to avoid an interruption of the enclosure, the end rings of the housing are provided additionally with bearing surfaces for the application of packings arranged between the housing ring and enclosure of the generator bus bar. The enclosed switch thus installed in the enclosure of the generator bus bar is supported preferably by way of intermediate insulating layers on the bottom, or on a supporting frame.

The advantages achieved by the invention include elimination of magnetic fields outside of the switch when the switch is installed in an enclosed generator bus bar. The form and arrangement of the housing current bars permits satisfactory screening of the magnetic fields. In particular, no current derived forces can act between individual switches, for example, of a three-phase generator bus bar system in the case of a short circuit, and no current-effected displacements can take place in the switch itself. Also, the design of the switch with the exteriorly located housing current bars and with the end rings of the housing provided with current connection surfaces permits direct installation of the switch according to the invention at practically any point of the generator bus bar. The housing current flowing over the enclosure of the generator bus bar is then conducted directly over the switch. The arrangement of several housing current bars with the interposed insulator plates permits not only a hermetic enclosure of the switch in the course of enclosing the generator bus bar, but due to the easy assembly and disassembly of the insulator plates, it also permits at the same time easy access to the interior for servicing the switch. Due to the radially symmetrical support of the switch, an extremely reliable fastening of the switch to the housing current bars can be achieved, this being of particular advantage when the switch is installed in open air high-current lines, i.e. when the enclosure with the housing current flowing over it is not provided. The electrodynamic forces then acting are positively intercepted by the housing rings and the housing current bars with the radially arranged supporting members acting as a frame structure.

A preferred embodiment of the invention will now be described and is illustrated in the accompanying drawings, wherein:

FIG. 1 is a view of the improved switch structure and its enclosure as seen in longitudinal vertical section;

FIG. 2 is an end elevation, only the half to one side of the vertical centerline through the structure being illustrated since the two halves are symmetrical, thus saving drawing space;

FIG. 3 is vertical transverse section taken on line 3—3 of FIG. 1, it being noted that, like FIG. 2, only one half to one side of the centerline has been included in the interest of saving space; and FIG. 4 is a sectional detail, drawn to an enlarged scale, showing the structure along one edge of a housing current bar by which an edge portion of the adjacent insulator plate is removably secured.

With reference now to the drawings, and to FIG. 1 in particular, the switch actually consists of two switching units 1 and 2 connected electrically in series and physically located coaxially along the axis $x$—$x$. The current flow path is from terminal 4 located at one end of the assembly through the contacts of switch 1, thence through the contacts of switch 2 and thence to terminal 3 at the opposite end of the assembly. Switch 1 is constructed as a circuit breaker, i.e. its contacts are structured to break the load current passing through the switch assembly, while switch 2 is constructed as a voltage isolator, i.e. its contacts are structured in the fashion of a disconnect switch, the contacts being opened subsequent to opening of the circuit through the main load breaking contacts of switch 1 in order to isolate the circuit. Since the detailed structure of the switches 1 and 2, and their drives for contact actuation are well-known, these have not been illustrated in detail.

Surrounding terminal 4 at one end of the two series-connected switches 1 and 2 is a housing ring 5 made from electrically conductive metallic material, and a similar housing ring 6 surrounds terminal 3 at the opposite end of the switches. The two end rings 5 and 6 are interconnected by four longitudinally extending profiled, rigid housing current bars 7, the bars being all of the same construction and electroconductive and arranged parallel with the axis x—x and located symmetrically in circumferentially spaced relation about that axis. The centerlines of the four bars are thus located 90° apart about the axis. In order to ensure good current transfer as between the opposite ends of bars 7 and the corresponding end rings 5 and 6, welding joints are preferred. The two switches 1 and 2 arranged along the axis are physically supported on that axis by means of two axially spaced spokelike arrays each consisting of four radially extending supporting members 8. The inner ends of these supporting members bear against the housing components of the switching units 1 and 2, and the outer ends bear against the profiled bars 7 which are sufficiently rigid to resist deformation.

The switch structure is so designed that it can be installed directly in the line, i.e. in the enclosure of a generator bus bar. In order to be able to conduct the housing current of the generator bus bar flowing over the enclosure through the switch also, the end rings 5 and 6 are provided with connection surfaces 9 for flexible current connections which establish the connection to the generator enclosure.

The housing current bars 7 are specially profiled and each longitudinally extending edge thereof terminates in a recess 10, shown in detail in FIG. 4, for receiving the corresponding edge portion of an insulator plate 11. Thus, as will be evident from FIG. 3 the enclosure structure for the switches 1 and 2 is constituted generally by four housing current bars 7 alternating as to location with four insulator plates 11, the opposite edge portions of each insulator plate being received in the recesses 10 of the bars 7. The recesses 10 along the opposite longitudinally extending edges of each bar 7 open in directions located 90° apart thus to position the insulator plates 11 located on opposite sides of the axis x—x parallel with one another.

It is a feature of the invention that the insulator plates 11 be readily removable so as to provide access to the switches 1 and 2 inside of the enclosure. For this purpose, the width of each insulator plate 11 is made less than the total distance between the bottom surfaces 10a of the recesses 10 in adjacently positioned bars 7. Thus, when a plate 11 is shifted laterally from the centered position depicted in FIG. 4 so that one edge 11a abuts against the bottom surface 10a of the recess, the opposite edge of the plate will be freed from its recess thus permitting the plate to be removed. Each plate 11 is held in its centered position within the recesses 10 by means of a clamping screw 13 which bears against one side of L-shaped member 19 that establishes a press contact with the edge portion of plate 11. To effect a hermetic enclosure, a packing 12 is positioned in each recess 10 between the edge portion of the insulator plate and a lateral extension 7a forming one side of the recess 10. A nose 14 is also provided on this extension 7a so as to facilitate centering of each insulator plate 11 in the recesses 10.

As previously explained, the dimensions and spacing of the housing current bars 7 and insulator plates 11 are so chosen that when one of the insulator plates is removed enough space is created to enable the switches 1 and 2 to be serviced and parts to be removed and replaced through the opening thus created.

The weight of the switch structure requires that a separate support be provided, i.e. the switch cannot be installed in a self-supporting manner in the generator bus bar. A special foot structure 15 is accordingly provided for the switch housing at each end thereof. In order to insulate the housing current bars 7 from ground, an insert 16 of insulating material is provided between the switch housing and each switch foot 15. A box 17 is located between the 2-foot structures 15 to house the miscellaneous control devices for the apparatus. An exhaust structure 18 is provided for carrying away the switching gases released during operation of the switches.

I claim:

1. In a high-current switch structure for installation in the line of a metal-enclosed generator bus bar, the combination comprising switching units connected electrically in series and arranged along a common axis between end connection terminals, an electrically conductive housing ring having current connection surfaces located at each of said end terminals and concentric with said axis, a plurality of circumferentially spaced electrically conductive housing current bars extended between and joined to said rings, the spacing between adjacent housing current bars being such as to permit access to said switching units for servicing and/or replacement through the gap which is formed between adjacent bars, and insulator plates extending between and removably supported by adjacent housing current bars thereby to establish an enclosure for said switch units.

2. A high-current switch structure as defined in claim 1 wherein said housing current bars include recesses extending longitudinally along the opposite sides thereof for receiving the longitudinally extending edge portions of said insulator plates.

3. A high-current switch structure as defined in claim 2 and further including means for removably securing the longitudinally extending edge portions of said insulator plates within said recesses in said housing current bars.

4. A high-current switch structure as defined in claim 3 and which further includes packing means interposed between the longitudinally extending edge portions of said insulator plates and the recessed portions of said housing current bars.

5. A high-current switch structure as defined in claim 1 which includes four of said housing current bars equally spaced about said switch axis and four insulator plates extending between and supported in recesses provided longitudinally along opposite sides of adjacent housing current bars to establish the enclosure for said switching units, the recesses provided along opposite sides of each said housing current bar being at a right angle.

* * * * *